United States Patent [19]

Falxa

[11] 3,876,540
[45] Apr. 8, 1975

[54] SKIMMING DEVICE
[75] Inventor: Henri Falxa, Lacq, France
[73] Assignee: Societe Anonyme dite: Societe Nationale des Petroles d'Aquitaine, Paris, France
[22] Filed: May 18, 1973
[21] Appl. No.: 361,412

[30] Foreign Application Priority Data
May 19, 1972 France .............. 72.18171

[52] U.S. Cl. ............ 210/97; 210/DIG. 21; 210/242
[51] Int. Cl. ............................................. B01d 35/14
[58] Field of Search ...... 210/83, 242, DIG. 21, 169, 210/97

[56] References Cited
UNITED STATES PATENTS
2,661,094  12/1953  Stewart .................. 210/242
2,670,848  3/1954   VanHouten et al. .......... 210/242 X
3,702,134  11/1972  Henning, Jr. et al. ....... 210/DIG. 21
3,722,688  3/1973   Wirsching ................. 210/242
3,759,390  9/1973   McCambie ................. 210/DIG. 21

Primary Examiner—Theodore A. Granger
Attorney, Agent, or Firm—Brisebois & Kruger

[57] ABSTRACT

This invention concerns the separation and extraction of the upper layer of liquids stored in tanks or pools.

The device consists of a shallow funnel, submerged in the liquid and equipped with means with draining off the extracted liquid, and characterized by the fact that the level of submersion, governing the amount of liquid drawn off, is regulated by a set of floats, which are either ballasted or adjusted in height, possibly by remote control.

The main applications of this appliance are in the treatment of open-air brine ponds and tanks for residual water in oil fields, refineries, paper mills and other chemical industries.

4 Claims, 4 Drawing Figures

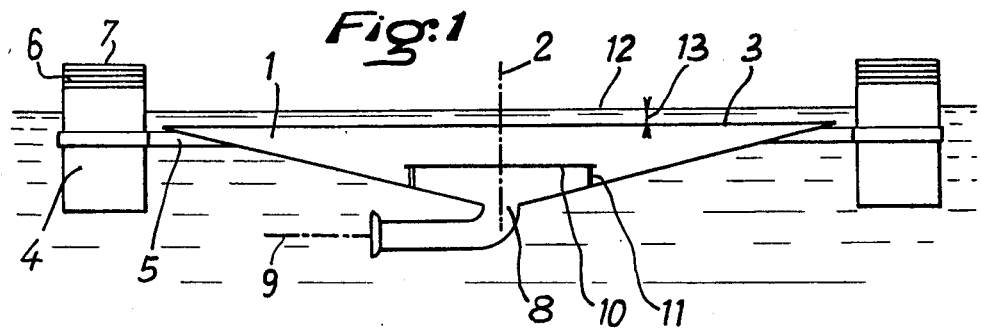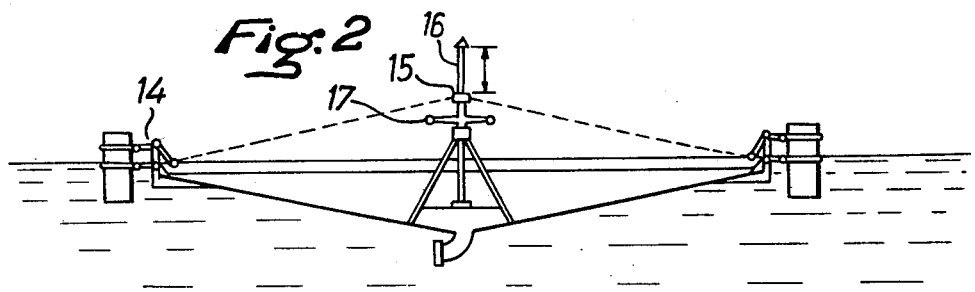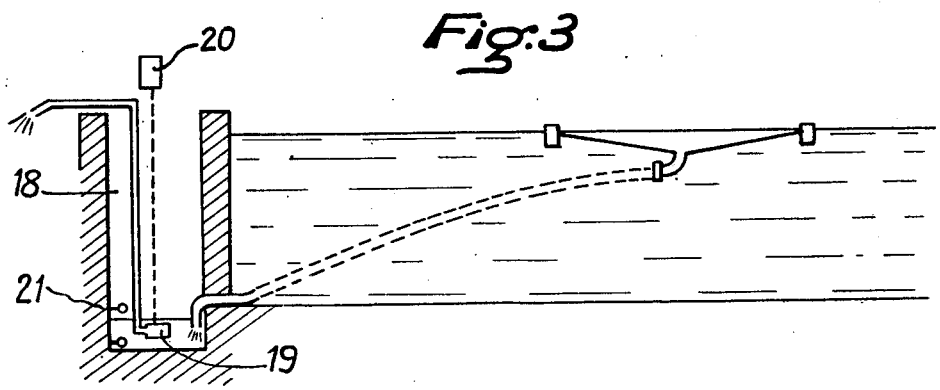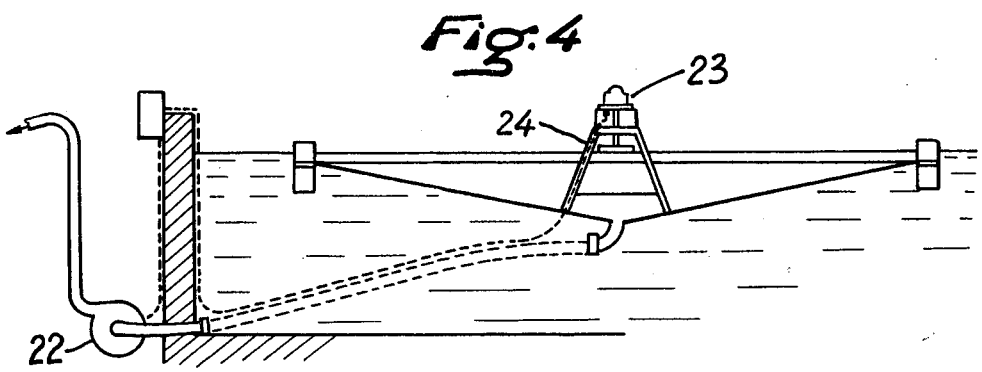

SKIMMING DEVICE

This invention concerns a floating device to skim still liquids without disturbing the lower depths.

The surfaces of swimming pools or similar installations are cleared by means of similar devices, consisting of a floating container with one or more inlets, the height of which can be adjusted in relation to the liquid in the pool by shutters, depending on the position of a float controlling the level inside the container.

But while such devices can be used to remove dirt from the surfaces of swimming pools and tanks, by extracting the liquid in the surface zone, they cannot extract liquids of given densities, since regulation of the inlet shutter affects only the rate of extraction.

This invention offers a way of separating liquids of different densities or, where the density varies continuously, of halting extraction at a pre-selected, pre-set density of effluent, since the inlet capacity depends on the buoyancy index of the floating device, which in turn depends on the density of the layers of liquid in which the different parts of the appliance are submerged.

This device comprises a container, open at the top, and the bottom of which contains an aperture connected to a flexible pipe leading to a pumping system, and is characterized by the fact that the container is equipped with a set of floats attached to its outer edge, and that the level of submersion of the device is adjustable, the whole upper edge of the container being on a horizontal plane which, under working conditions, is beneath the surface of the liquid.

The buoyancy of the device, which depends on the shapes and masses of the various components, and the density of the various layers of liquid in which it is submerged, govern the distance between the upper edge of the container and the surface of the liquid.

The buoyancy of the device can be regulated by providing means of ballasting the floats, or means of adjusting their height in relation to the container.

In one particular embodiment, the means of controlling the position of the floats consist of rods or cables, and the device comprises a system to exert traction on these rods or cables, and means of operating this traction system.

In one embodiment, the means of operating the traction system consist of a source of mechanical energy, remote-controlled on the basis of readings from an instrument to measure the density of the liquid to be extracted.

In one recommended embodiment, and regardless of the means of regulating the buoyancy of the appliance, a horizontal plate is fitted above the drainage aperture, connected to the inside surface of the container by rigid supports, set apart from each other, and the outer edge of this plate is at a uniform distance from the inside surface of the container, so that the total outlet area is not much greater than the cross-sectional area of the drainage aperture. This plate is designed to prevent any cavitation effect, which could cause air to be drawn in during extraction.

One embodiment comprises a level detector, controlled by a float, the vertical movement of which is limited by two levels, an upper level above the upper edge of the container, at which level the pump starts up, and a lower level between the plane of the upper edge of the container and the plane of the horizontal plate above the drainage aperture, at which level the pump stops.

The device can if necessary be moved over the surface of the tank or pool either by being pulled with a cable or by means of a propelling system with a rudder, the propeller being far enough below the surface of the liquid not to disturb the upper layers, and being radio-controlled, by an operator or fixed programmed unit. The electricity cables can be attached to the drainage pipe.

It will be easier to understand the invention from the following description of two possible embodiments, with reference to the accompanying illustrations.

FIG. 1 shows the container (1), which is cone-shaped with a vertical symmetrical axis (2) and circular upper edge (3). Floats (4) are placed round the edge of the container (the figure shows two such floats, positioned symmetrically in relation to the container axis), connected to the container by arms (5), and with a cavity (6) to hold ballast (7) at the top.

The bottom of the container has a drainage aperture (8), connected to a flexible pipe (9). At the lower end of the container there is a circular plate (10), concentric with the container and connected to its inner surface by rigid supports (11), spaced out from one another. The distance from the edge of the plate to the inner surface of the container is such that the total outlet area for the liquid is not much greater than the cross-sectional area of the drainage aperture.

The upper edge (3) of the container is at a certain depth (13) beneath the surface (12) of the liquid; the product of this distance by the perimeter of the upper edge of the container gives the inlet capacity of the container.

FIG. 2 shows another embodiment of the appliance, in which each of at least two floats, or any greater even number, is attached to the container by means of an arm (14), one end of of which is pivotally attached to a float and the other end of which is pivotally connected to a nut (15) which can be moved along a threaded shank (16), by means of a wheel (17), concentric with the container, thus moving the floats vertically in relation to the container since the arm is mounted to swing about a central pivot point, as best seen in FIG. 2. This wheel can be operated manually, or remote-controlled from a control post on the edge of the tank or pool. This remote-control system can be operated automatically, by means of data from an instrument to measure the depth of liquid still to be extracted, by comparison between the level detected by a float and a pre-selected final level, or by data from an instrument to measure the density of the surface layer of the liquid, such as a hydrometer, by comparison between such data and a pre-selected density, at which extraction is to stop.

In this case the wheel is operated by a motor, powered by a cable from the control post on the edge of the tank. This remote-control system is particularly useful when skimming settling tanks receiving effluents from several industrial plants, in which the density of the surface layer can vary rapidly, so that the extraction device has to be adjusted accordingly.

FIG. 3 shows a skimming device as in FIGS. 1 or 2, together with a drainage system involving gravity flow into a sump (18), containing a pump (19) driven by a motor (20), switched on or off by a level-gauge (21) inside the sump.

FIG. 4 shows a skimming device as in FIGS. 1 or 2, in cases in which operating conditions do not allow the container to be unprimed. The pump (22) is directly fitted to the flexible pipe, and is controlled automatically by level variations inside the container, as registered by a level detector (23).

This detector is controlled by a float (24), the vertical movement of which is restricted to retain it between two levels : an upper level above the upper edge of the container, at which the inlet capacity of the container is greater than the maximum capacity of the pump, and at which the pump starts up, and a lower level, between the plane of the upper edge of the container and the plane of the horizontal plate above the drainage aperture, at which level the pump stops. The exact position of this lower level depends on the depth of the surface layer of liquid that is to be allowed to collect before the pump starts up.

Skimming devices of this type have been used in several cases to extract rainwater polluting open-air brine ponds. Such ponds extend over an area of several hectares and are used to store brine containing approximately 300 g of salt per litre. Rainfall results in a layer of non-saline water forming on the surface, the volume of which corresponds approximately to the amount of rainfall. Surface disturbance by atmospheric agents creates a polluted zone, the depth of which increases with time, and in which salinity varies with depth.

One method is to prevent the formation of a polluted zone by removing the non-saline water resulting from each rainfall. If a margin of about 10 cm depth of rainwater-polluted brine is allowed, with the pump starting when this margin is exceeded, the simplified version in which the weight or height of the floats is adjusted, is adequate. Water ceases to enter the container, resulting either in unpriming emergence of the edge of the container above the surface of the liquid, or in the halting of drainage, when the polluted surface layer has been removed. Under favourable conditions, in the absence of surface disturbance, effluent with a density of 1.195 could be drained off, compared with a brine density of 1.21. With a container 150 cm in diameter, a rate of 25 cu.m per hour of effluent was achieved.

If it is necessary to remove any rainwater quickly, with a margin of only 1 cm of polluted brine, a remote-control system, using a rain-gauge on the edge of the tank, is used to start up the pump and if necessary adjust the position of the floats.

A considerable accumulation of non-saline water, or even the development of a thick polluted zone, may be allowed during very rainy periods, since systematic removal of such rainwater could result in draining off large and expensive quantities of salt. As the polluted zone becomes deeper, to some extent it may be regarded as protecting the brine beneath. When the polluted layer has to be drained off, the version with adjustable floats is used, with very wide adjustment during most of the operation and a series of remote-controlled adjustments during the final phase, depending on the density of the effluent.

This new skimming device can be used in any cases involving extraction of liquids of varying viscosities on the surface of settling tanks, and in particular liquid hydrocarbons, which are usually hydrated and often emulsified, and which have to be removed, in order to purify the water and allow recovery of the hydrocarbons. When settling tanks receive effluents from several plants, and the types and physical properties of the hydrocarbons vary, the buoyancy of the device can be adjusted to take account of the density and other properties, such as viscosity, of each effluent. In such cases, the version with remote-controlled floats is recommended.

The invention is in no way confined to the details of the various embodiments mentioned above.

Applications already referred to concern oil-production and refining installations and underground storage tanks for brine. The devices can be used in the salt industry, in paper making, and in many chemical plants, as well as in plants for the processing of agricultural produce, notably sugar mills, distilleries and canneries.

They can be used, continuously or intermittently, to skim off impurities, such as grease or solid waste, floating on the surface of any homogeneous liquid.

What is claimed is:

1. In a device to skim a body of still liquid which comprises a container which is open at its top and has an aperture in its bottom connected to a pump, a set of floats, and means connecting said floats to said container to hold the upper edge of said container in a horizontal plane which is, under normal working conditions, beneath the surface of the liquid, the improvement according to which said connecting means comprises a plurality of arms, each mounted to swing in a vertical direction about a point intermediate its ends, one end of each arm being connected to one of said floats, and the other ends of said arms being connected to a nut vertically adjustable on a central threaded member carried by said container, so that vertical adjustment of said nut swings said arms in a vertical direction to alter the height of the container relative to said floats and consequently relative to said liquid, means for detecting changes in a physical characteristic of the body of liquid being skimmed, and means controlled by said detecting means for automatically adjusting said adjustable connecting means in response to those changes in physical characteristics which are detected.

2. A device as claimed in claim 1 in which said means for detecting changes in a physical characteristic is responsive to changes in the depth of the body of liquid being skimmed.

3. A device as claimed in claim 1 in which said means for detecting changes in a physical characteristic is responsive to changes in the density of the surface layer of liquid in the tank.

4. A device as claimed in claim 1, comprising a level detector connected to control said pump and controlled by a float responsive to the level of the body of liquid being skimmed, the vertical movement of which float is limited by two levels, an upper level above the upper edge of the container, at which level the pump starts up, and a lower level, between the plane of the upper edge of the container and the plane of a horizontal plate above the aperture, at which level the pump stops.

* * * * *